US012162183B2

(12) United States Patent
Kankkunen

(10) Patent No.: US 12,162,183 B2
(45) Date of Patent: Dec. 10, 2024

(54) METHOD FOR MANUFACTURING PREFABRICATED CONCRETE PRODUCTS

(71) Applicant: Elematic Oyj, Akaa (FI)

(72) Inventor: Heikki Kankkunen, Vantaa (FI)

(73) Assignee: Elematic Oyj, Akaa (FI)

(*) Notice: Subject to any disclaimer, the term of this patent is extended or adjusted under 35 U.S.C. 154(b) by 214 days.

(21) Appl. No.: 16/776,539

(22) Filed: Jan. 30, 2020

(65) Prior Publication Data

US 2020/0254647 A1 Aug. 13, 2020

(30) Foreign Application Priority Data

Feb. 12, 2019 (FI) ...................................... 20195104

(51) Int. Cl.
*B28B 1/08* (2006.01)
*B28B 3/22* (2006.01)
*B28B 7/02* (2006.01)

(52) U.S. Cl.
CPC .............. *B28B 1/084* (2013.01); *B28B 3/228* (2013.01); *B28B 7/02* (2013.01)

(58) Field of Classification Search
CPC ... E04B 5/043; E04B 5/17; E04B 5/04; E04B 1/16; E04B 1/32; E04B 1/36; B28B 1/084; B28B 1/093; B28B 1/0935; B28B 1/14; B28B 1/26; B28B 1/52; B28B 1/267; B28B 1/268; B28B 1/30; B28B 1/44; B28B 1/495; B28B 1/506; B28B 7/14; B28B 3/228; B28B 1/08; B28B 23/00; B28B 23/0025
USPC ............................................. 52/220.1, 220.2
See application file for complete search history.

(56) References Cited

U.S. PATENT DOCUMENTS 3,740,176 A * 6/1973 Nilsson ................... B28B 1/084 425/224
3,926,541 A * 12/1975 Hewitt .................... B28B 1/084 425/432
4,145,155 A * 3/1979 Ogaki ................ E01C 19/4893 404/104
5,035,100 A * 7/1991 Sachs ...................... B28B 11/16 52/745.05

(Continued)

FOREIGN PATENT DOCUMENTS

DE 202004006289 U1 * 7/2004 ........... E04G 15/061
DE 102014106946 A1 * 11/2015 ............. A01K 1/015

(Continued)

OTHER PUBLICATIONS

Machine English translation of Bong et al. KR-101442021-B1, (2014) (Year: 2014).*

(Continued)

*Primary Examiner* — Jeffrey M Wollschlager
*Assistant Examiner* — Edgaredmanuel Troche
(74) *Attorney, Agent, or Firm* — Meunier Carlin & Curfman LLC

(57) ABSTRACT

A method for manufacturing a prefabricated concrete product is disclosed, in which method, a concrete slab with a recess at its upper surface is cast with slipform casting on a casting bed, and after the slipform casting of the slab the recess of the fresh cast slab is equipped with ducts, piping and/or wiring components, after which the recess is covered with concrete mass, and the concrete product is left to cure. The invention also relates to such a prefabricated concrete product.

5 Claims, 3 Drawing Sheets

(56) References Cited

U.S. PATENT DOCUMENTS

Figure 1A:
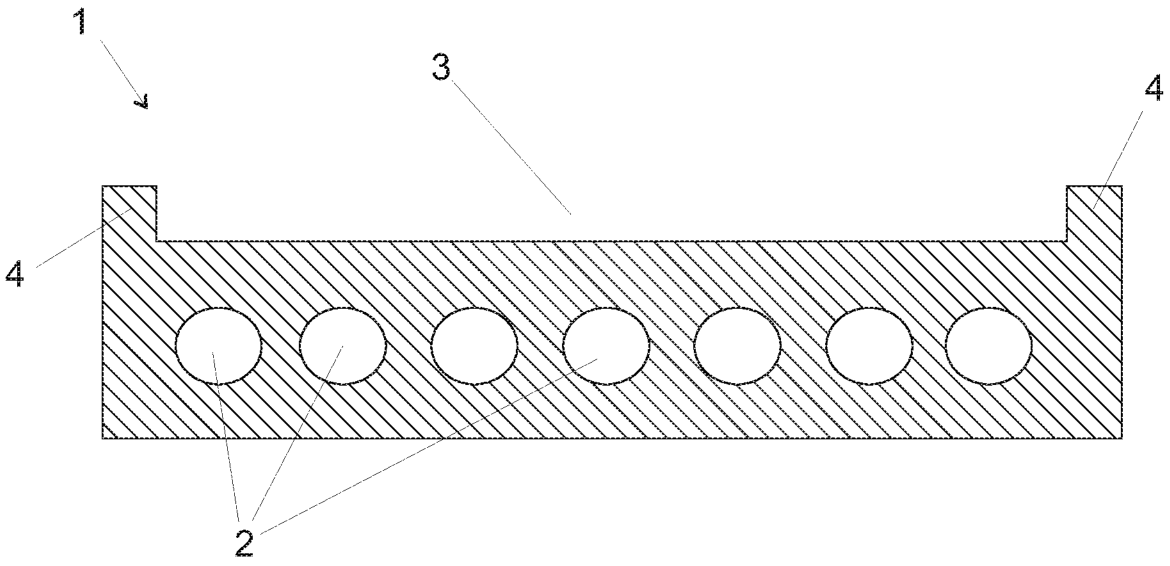

| | | | | | |
|---|---|---|---|---|---|
| 5,779,953 | A * | 7/1998 | Harala | B28B 13/02 | 425/432 |
| 6,845,591 | B1 * | 1/2005 | van Paaseen | E04B 5/48 | 52/607 |
| 2001/0032426 | A1 * | 10/2001 | VanderWerf | B28B 19/0061 | 52/796.1 |
| 2016/0214273 | A1 * | 7/2016 | Luotoharju | B28B 3/228 | |

FOREIGN PATENT DOCUMENTS

| | | | | |
|---|---|---|---|---|
| EP | 0825307 | A1 | 2/1998 | |
| EP | 1214483 | A2 | 6/2002 | |
| EP | 1332851 | A2 | 8/2003 | |
| EP | 1655120 | A1 * | 5/2006 | E04B 5/023 |
| EP | 1835090 | A2 * | 9/2007 | E04F 17/08 |
| EP | 2339075 | A1 * | 6/2011 | E03F 5/04 |
| EP | 2657423 | A1 * | 10/2013 | B28B 1/084 |
| EP | 2818606 | A1 * | 12/2014 | B28B 1/084 |
| EP | 2339075 | B1 * | 9/2015 | E04B 5/48 |
| EP | 3056328 | B1 | 2/2018 | |
| EP | 3517698 | A1 | 7/2019 | |
| FI | 20021650 | A | 3/2004 | |
| JP | 08239934 | A * | 9/1996 | |
| JP | 11241349 | A * | 9/1999 | |
| KR | 19980060520 | U * | 11/1998 | |
| KR | 1442021 | B1 * | 9/2014 | E01D 19/125 |
| KR | 20180120493 | A | 11/2018 | |
| NL | 1030969 | C2 * | 7/2006 | B28B 1/084 |
| RU | 2024707 | C1 | 12/1994 | |
| RU | 2175287 | C1 | 10/2001 | |

OTHER PUBLICATIONS

Machine English translation of Stroeve et al. (NL-1030969-C2); Retrieved from https://patents.google.com/patent/NL1030969C2/en?oq=NL+1030969+C2 (Year: 2006).*

Machine English translation of FWR Solutions GMBH DE-202004006289-U1 (Year: 2004).*

Machine English translation of Makino et al. JP-08239934-A (Year: 1996).*

Machine English translation of "Heechul Noh" (KR19980060520U) (Year: 1998).*

Machine English translation of Hartmann Hans (DE-102014106946-A1) (Year: 2015).*

Machine English translation of Aoki et al. (JP-11241349-A) (Year: 1999).*

Finnish Patent and Registration Office, Search report of FI20195104 dated Aug. 29, 2019, 2 pages.

www.nilcon.se/secure/catarsis_presentation.pdf Nilcon retrieved Mar. 9, 2023.

https://www.bouwwereld.nl/producten/flexibel-bouwen-met-leidingvloeren/ retrieved Mar. 9, 2023.

* cited by examiner

METHOD FOR MANUFACTURING PREFABRICATED CONCRETE PRODUCTS

CROSS-REFERENCE TO RELATED APPLICATIONS

This application claims priority to Finnish Patent Application No. 20195104, filed on Feb. 12, 2019, the contents of which are incorporated herein by reference in their entirety.

The present invention relates to a prefabrication of concrete products containing a step of slipform casting a concrete slab.

Prefabricated concrete slabs, such as hollow-core slabs and solid slabs, are conventionally cast as slipform casting on elongate casting beds in a continuous casting process. The length of said continuous casting process is defined either on the basis of the combined length of the elements to be cast, or on the basis of the maximum length of the casting bed. The length of casting beds used in slipform casting can be up to 150-200 m, depending on the size of the element factory. After the slipform casting equipment has cast a continuous slab on the casting bed, the cast concrete mix is allowed to cure on the casting bed. When the concrete mix is cured, the uniform cast concrete slab is sawed in predetermined lengths on the basis of the targets of usage of the final elements, and the sawn concrete elements are lifted off the casting bed to storage, to wait for transportation to their respective locations of usage.

In slipform casting devices, concrete mix is fed either in one or several stages to a casting mold moving along with the casting device, said mold being formed by side walls of the mold and vibrating beam defining the top surface of the mold, together with the casting bed. The side walls and vibrating beam of the casting mold perform a vibrating and/or troweling compacting motion for compacting the concrete product. When casting hollow-core slabs, the slipform casting device is provided with means for forming the cavities. Generally, a slipform casting device is a casting machine moving on a stationary casting bed along with the casting process, but a slipform casting device can also be realized as a stationary casting station, in which case the casting bed moves along with the casting process with respect to the casting station. The two most common types of slipform casting methods are extruder and slipformer methods, wherein the extruder method concrete mix is fed in a single feeding stage to the slipform casting mold, and in the slipformer method the concrete mass is fed in two or more feeding stages to the slipform casting mold.

Generally concrete elements cast by slipform casting are prestressed, i.e, they are provided with reinforcing wires. Moreover, after slipform casting, the cast concrete elements can be provided with different apertures or cavities, for example for lead-ins or other required post-casting build-up of the elements. These apertures and/or cavities are typically formed by removing cast concrete mass from the fresh slipform cast concrete product at predefined locations, and the removal of the concrete mass is typically done during the slipfom casting process for the already cast portion of the slab.

Slipform cast hollow-core or massive slabs are typically used as intermediate floor slab in buildings. Presently, however, the use of prefabricated slipform cast concrete slabs in construction of buildings has decreased, due to the high amount of required work steps after the installation of the slabs at the work site.

The present invention provides a further developed prefabricated concrete element, which eliminates most of the extra work steps at construction site in comparison of the traditional slipform cast slabs.

In the present invention a slipform cast slab is cast in such a form that a depression or groove is formed on the upper surface of the slab, to which depression or recess is then utilized for installation of required ducts, piping and/or wiring components. After the installation of the components, the depression in the slab together with the installed components is covered with concrete mass. After curing of the slipform cast portion and the later cast concrete, the slabs are cut to the final lengths, re-moved from the slipform casting bed and transported to the construction site or to storage to wait for the transportation to the construction site.

At the construction site the prefabricated slabs are installed at their places, the ducts, piping and/or wiring equipment included in the prefabricated slab is connected, after which the thus formed floor is ready for final finishing steps.

In the present invention the slipform cast slab does not require any additional mold formation for the concrete casting fill covering the installed ducts, piping and/or wiring components, since the raised portions at the edges of the slipform cast slab defines the sidewalls for the recess, and these raised side portions define the final slab height.

In the method of the invention for manufacturing a prefabricated concrete product a concrete floor slab with a recess at its upper surface is cast with slipform casting on a casting bed, wherein after the slipform casting of the slab the recess of the fresh cast slab is equipped with ducts, piping and/or wiring components, after which the recess is filled with concrete mass, and the concrete product is left to cure.

In the context of the present invention the recess formed on the upper surface of the slipform cast concrete slab extends downwards from the upper surface of the slab in its cross-section, and the recess is defined by its bottom and side surfaces. The side surfaces of the recess are formed by raised portions at the vertical sides of the cross-section of the slab, the top surfaces of the raised portions defining the top surface level of the slipform cast concrete slab, as well as preferably the top surface of the final prefabricated concrete product. And since the cross-section of the slipform cast concrete slab is defined by the slipform mold used in the casting, the formed recess extends uniformly along the length of the slipform cast concrete slab.

In the context of the present invention the ducts, piping and/or wiring components mean AC ducts, water pipes, sewer pipes, floor heating pipes, i.e. HEPAC (Heating, Plumbing and Air Conditioning) components, and/or also data and electrical cabling, for example. Further, different kinds of sensors may also be included in these components to be added in the recess.

In the method of the invention the area of the recess covers substantially whole of the upper surface of the slipform cast concrete slab. Thus, there are only narrow portions of the upper surface of the raised portions defining the side surfaces of the recess in the cross-section of the slipform cast concrete slab.

In an embodiment of the method of the invention a continuous slipform cast slab contains a plurality of concrete product lengths, and after curing of the slab and the concrete cast covering the recess the cured slab is cut to final product lengths and removed from the casting bed.

In an embodiment of the method of the invention the slipform cast concrete slab is a massive slab or a hollow-core slab. In the embodiment of a hollow-core slab, the area of the recess is formed above the hollow-cores in the cross-section of the slab, and the recess does not extend in the area of the hollow-cores.

In an embodiment of the method of the invention the concrete cast to cover the recess on the slipform cast slab is self-compacting concrete mix.

In an embodiment of the method of the invention in a section of the slipform cast slab the side edges defining the recess are removed for forming a level depression in the concrete product.

The present invention also provides a prefabricated concrete product, which product comprises a slipform cast concrete floor slab with a recess at the upper surface of the slab, which recess is continuous along the length of the slab and covers substantially whole of the upper surface of the slipform cast slab with narrow raised portions defining the side surfaces of the recess, which product comprises ducts, piping and/or wiring components installed in the recess at the prefabrication site, and a concrete layer cast to fill the recess and cover the said components installed therein.

In an embodiment of the prefabricated concrete product, the product comprises a section with lowered upper surface, which lowered section is formed by removing side edges defining the recess at the upper surface of the slab.

In an embodiment of the prefabricated concrete product, the product is a massive slab or a hollow-core slab. In the embodiment of a hollow-core slab, the area of the recess is formed above the hollow-cores in the cross-section of the slab, and the recess does not extend in the area of the hollow-cores.

More precisely the features defining a method in accordance with the present invention are described herein, and the features defining a prefabricated concrete product are described herein. Present advantageous features and embodiments of the invention are also described herein.

Figure 1B:
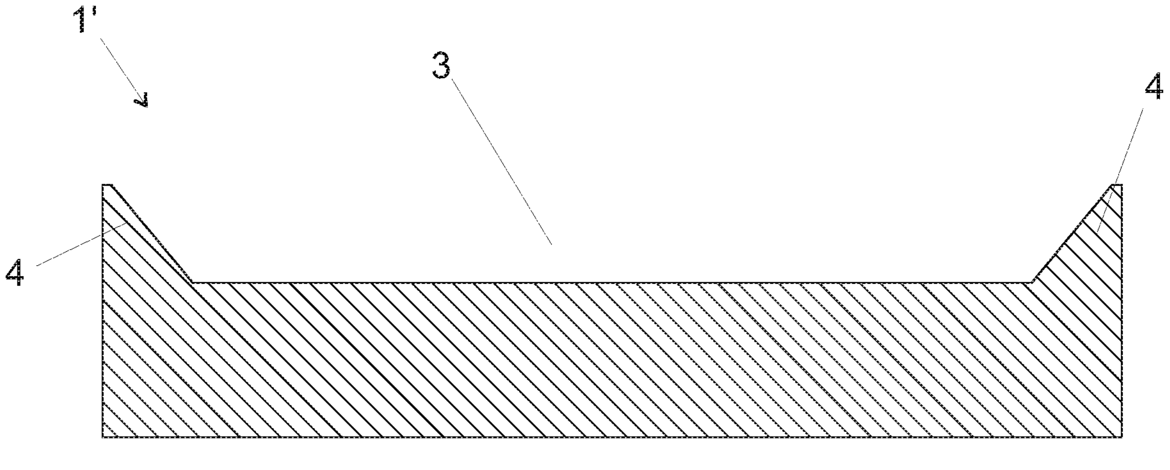
Figure 2A:
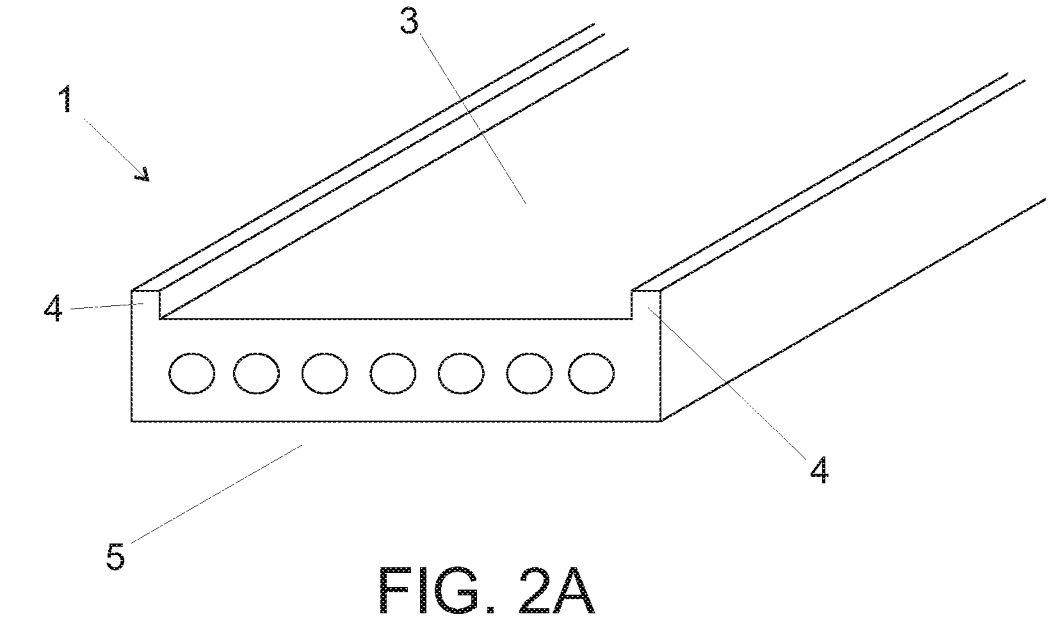
Figure 2B:
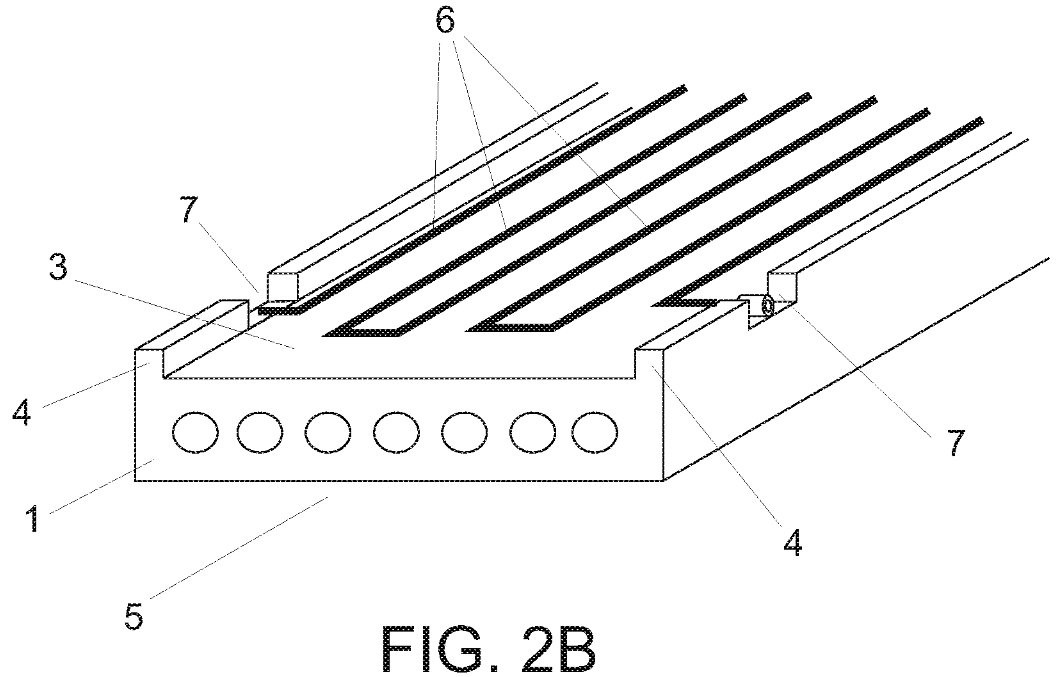
Figure 2C:
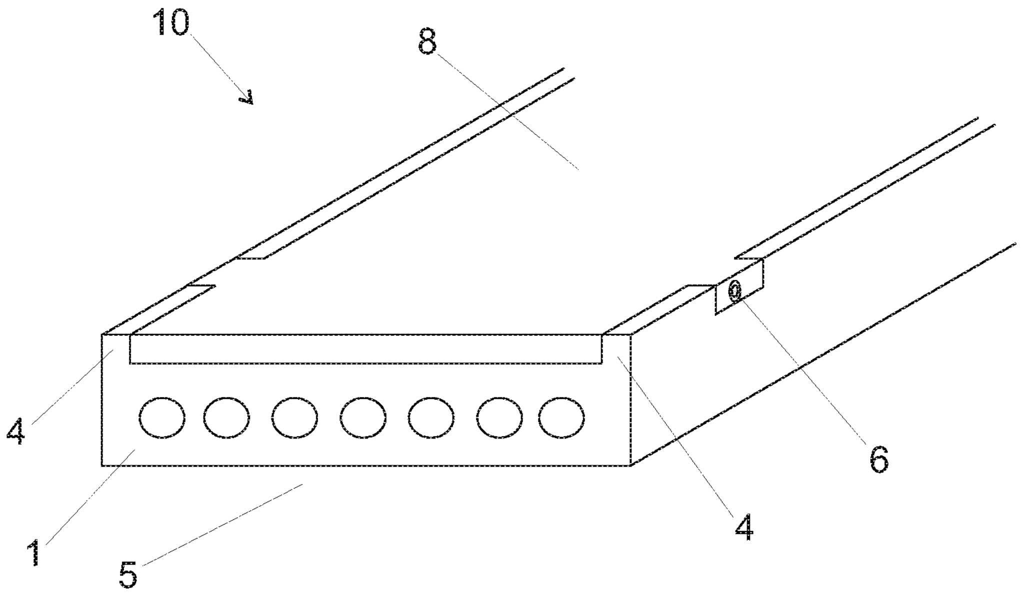
Figure 3:
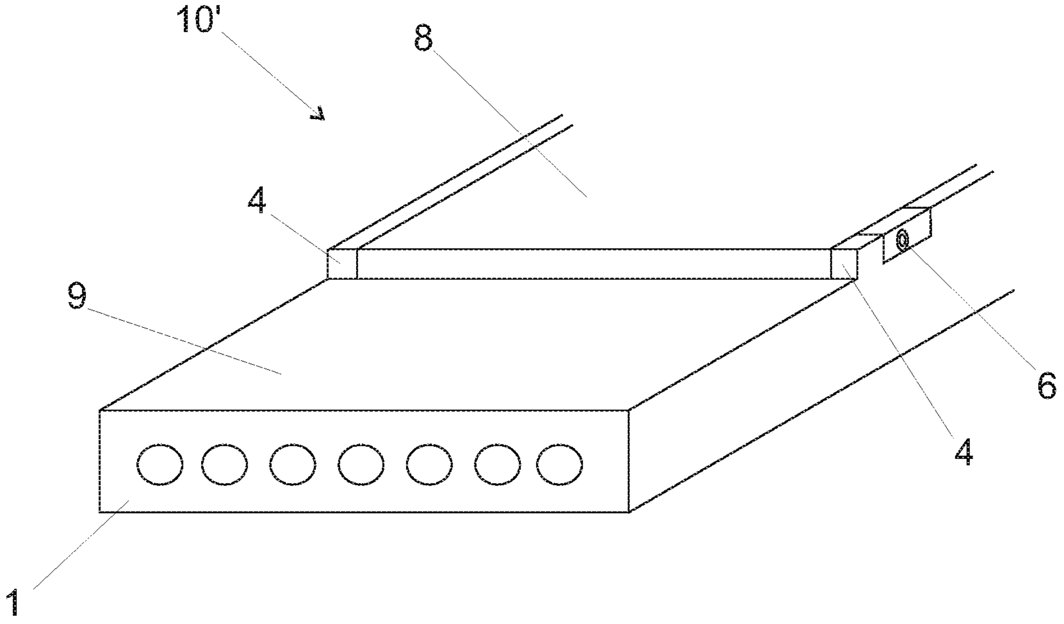

Exemplifying embodiments of the invention and their advantages are explained in greater detail below in the sense of example and with reference to accompanying drawings, where FIGS. 1A and 1B show schematically embodiments of cross sections of the slipform cast slabs of the prefabricated concrete product of the invention, FIGS. 2A-2C show schematically the main phases of the manufacture of a prefabricated concrete product of the invention, and FIG. 3 shows schematically an alternative embodiment of a prefabricated concrete product of the invention.

FIGS. 1A and 1B show schematically cross-sections of the slipform cast concrete slabs 1 to be used in a prefabricated concrete product of the invention.

In the embodiment of FIG. 1A the concrete slab 1 is a hollow core slab comprising a plurality of hollow cores 2 extending longitudinally inside the slab. The concrete slab 1 is also pre-stressed, which prestressing is obtained with reinforcement wires (not shown) extending longitudinally inside the slab.

In the upper surface of the concrete slab 1 is formed a recess 3 by adding raised edge portions 4 on the upper surface of the concrete slab. In this embodiment, the total height of the slab 1 is 270 mm, and the depth of the recess 3 is 70 mm.

In the embodiment of FIG. 1B the concrete slab 1' is a massive slab, and preferably also pre-stressed. In this embodiment the raised edge portions 4 define slanted side surfaces for the recess 3. Further, in this embodiment the formed recess 3 covers substantially the whole of the upper surface of the slipform cast slab 1', since there are only very small sections of the top surfaces of the raised portions 4 left in the cross-section. The depth of the recess 3 is in this embodiment greater than in the embodiment of FIG. 1A, since there are no hollow cores restricting the area available for the recess 3 in the cross-section.

The outer surfaces of the concrete slabs 1, 1' in the embodiments of FIGS. 1A and 1B also defines the cross-sections of the slipform molds utilized in the slipform casting of the slabs. Publication EP 3 056 328 B1 discloses one solution for the upper surface of the slipform casting mold that can be utilized for casting such a recess 3 on an upper surface of a slipform cast slabs 1, 1', for example.

FIGS. 2A-2C show schematically an embodiment of the main phases for manufacturing a prefabricated concrete product of the invention.

FIG. 2A shows a concrete slab 1, having in this embodiment the cross-section shown in FIG. 1, which is first slipform cast on a casting bed 5. The concrete slab 1 comprises a recess 3 on the upper surface of the slab, which recess is restricted at its sides with raised edge portions 4.

Next, as shown in FIG. 2B, while the concrete slab 1 is still fresh and uncured, in the recess 3 of the slab 1 is installed piping 6, which in this embodiment is water piping of an underfloor heating system. For forming connection points of the piping 6 sections 7 of the raised edge portions 4 of the concrete slab 1 are removed. Via these connection points the piping 6 can be connected to piping of an adjacent concrete product and/or to the rest of the underfloor heating system at the construction site.

After the piping 6 has been installed in the recess 3, the recess is covered with a cast concrete layer 8, as shown in FIG. 2C, and the whole cast entity is left to cure.

The cast concrete layer 8 preferably only covers the recess 3 up to the same level as the upper surfaces of the raised edge portions 4, so that the raised edge portions 4 can be used as a part of the mold for the concrete layer 8. After curing the prefabricated concrete product entity 10 is either cut to final lengths on the casting bed 5 and removed from the casting, or if cast in final length then just removed from the casting bed. The ready prefabricated concrete products 10 can then be transported to the construction site for final installation. The concrete used for the concrete layer 8 is preferably self-compacting concrete mix.

FIG. 3 shows schematically an alternative embodiment of a prefabricated concrete product 10' of the invention. This embodiment corresponds otherwise the one manufactured in the embodiment of FIGS. 2A-2C, but at the end area of the concrete slab 1 is formed a level lowered section 9 by removing the raised edge portions 4 of the slab 1. This removal of the raised edge portions 4 is preferably done simultaneously as other components, such as piping in FIG. 2B, are in-stalled at the remaining part of the recess while the slipform cast concrete is still fresh.

The formed lowered section 9 of the prefabricated concrete product 10' can be utilized at the construction site as an installation space for prefabricated bathroom module, for example.

The specific exemplifying embodiments of the invention shown in figures and discussed above should not be construed as limiting. A person skilled in the art can amend and modify the embodiments described in many evident ways within the scope of the attached claims. Thus, the invention is not limited merely to the embodiments described above.

The invention claimed is:

1. A method for manufacturing a prefabricated concrete product by slipform casting comprising the steps of:

casting with a slipform casting on a casting bed a concrete floor slab having a single recess on an upper surface, wherein the recess is formed during the slipform casting of the concrete floor slab and is defined by a slipform casting mold and extends along a full length of the slipform cast, and narrow raised portions along two parallel edges of the slipform cast define side surfaces of the single recess, and wherein an area of the single recess covers whole upper surface of the slipform cast concrete slab between the raised portions;

equipping the single recess of the freshly cast concrete floor slab on the casting bed with ducts, piping and/or wiring components;

filling the single recess equipped with the ducts, piping and/or wiring components up to upper surfaces of the narrow raised portions with a concrete mass on the casting bed to form the concrete product;

allowing the concrete product to cure on the casting bed; and removing the cured concrete product from the casting bed.

2. The method according to claim 1, wherein casting is performed in a continuous slipform cast slab containing a plurality of concrete product lengths, and wherein after curing of the slab the cured slab is cut to final product lengths and removed from the casting bed.

3. The method according to claim 1, wherein the slipform cast concrete slab is a massive slab or a hollow-core slab, in which hollow-core slab the hollow cores are formed underneath the single recess.

4. The method according to claim 1, wherein the concrete cast to cover the single recess on the slipform cast slab is self-compacting concrete mix.

5. The method according to claim 1, wherein in a section of the slipform cast slab the narrow raised portions defining the recess are removed for forming a level depression in the concrete product.

* * * * *